United States Patent [19]
Burgess, Jr.

[11] 3,877,585
[45] Apr. 15, 1975

[54] MATERIAL DISTRIBUTING SYSTEM FOR NONFREE-FLOWING PRODUCTS

[76] Inventor: Ralph D. Burgess, Jr., 2800 Pheasant Rd., Excelsior, Minn. 55331

[22] Filed: Feb. 4, 1974

[21] Appl. No.: 439,342

[52] U.S. Cl.................. 214/17 CA; 198/36; 198/37
[51] Int. Cl............................................. B65g 65/30
[58] Field of Search ............ 198/42, 36, 37, 38, 40, 198/102, 39, 54; 214/201, 17 C, 17 A, 17 CA, 17 CB; 222/56

[56] References Cited
UNITED STATES PATENTS

| | | | |
|---|---|---|---|
| 2,717,703 | 9/1955 | Kull et al. | 214/17 C |
| 3,435,967 | 4/1969 | Sackett, Sr. | 214/17 CA |
| 3,774,785 | 11/1973 | Gasseling | 214/17 CA |

Primary Examiner—Richard A. Schacher
Assistant Examiner—James M. Slattery
Attorney, Agent, or Firm—Schroeder, Seigfried, Ryan & Vidas

[57] ABSTRACT

A material distributing system for continuously maintaining in optimum condition the level and location of nonfreeflowing particulate material within a bin from which such material is continuously being drawn, as in food packaging operations, is disclosed. A belt conveyor continuously brings material from a source of supply to a movable distributing assembly which moves back and forth along the length of the bin and includes a slotted transversely extending vibrating pan. The belt conveyor is arranged to constantly urge the assembly forwardly and to drive a differential transmission, one output of which drives a rotary material sensor which extends into the bin. The other output powers a mechanism which drives the assembly rearwardly when the rotation of the sensor is arrested by material in the bin. The belt conveyor also powers the vibrating pan.

23 Claims, 8 Drawing Figures

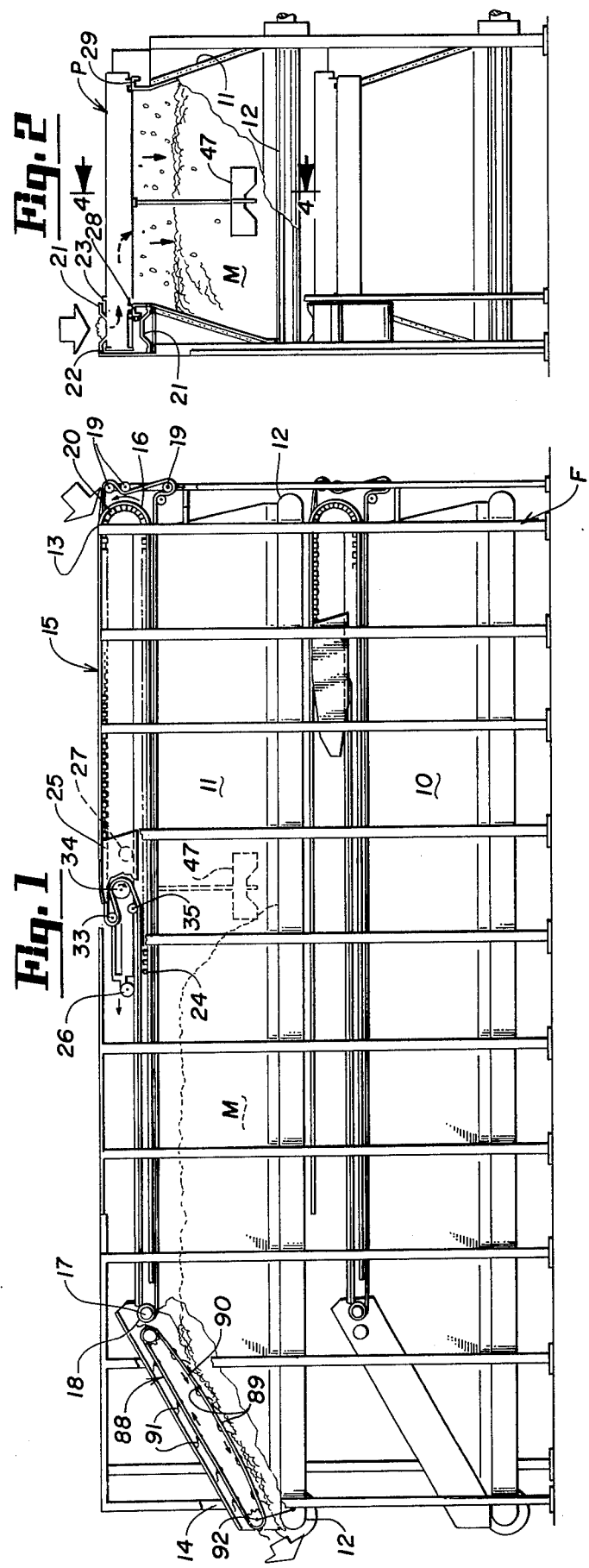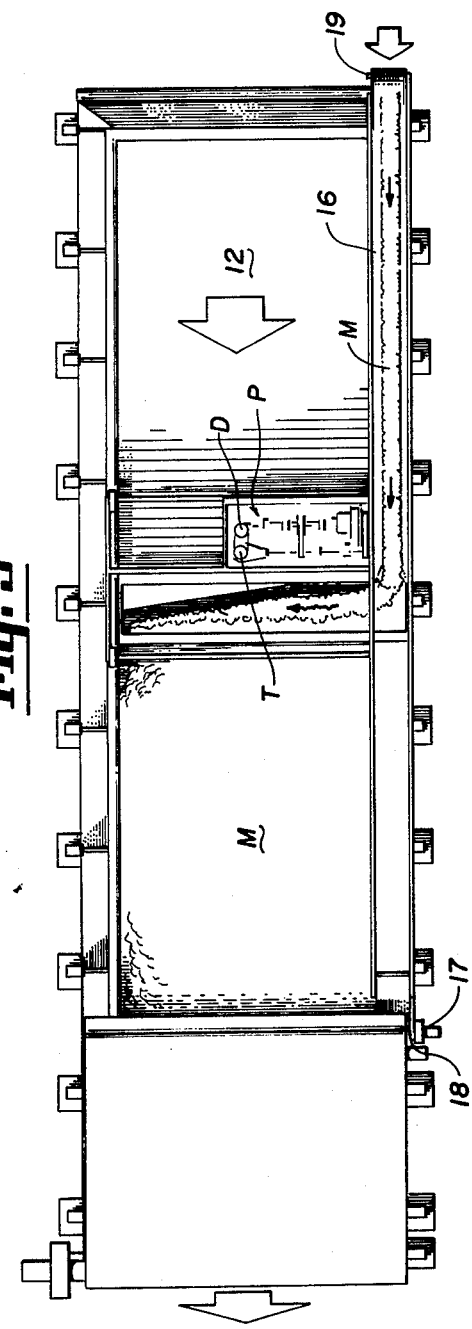

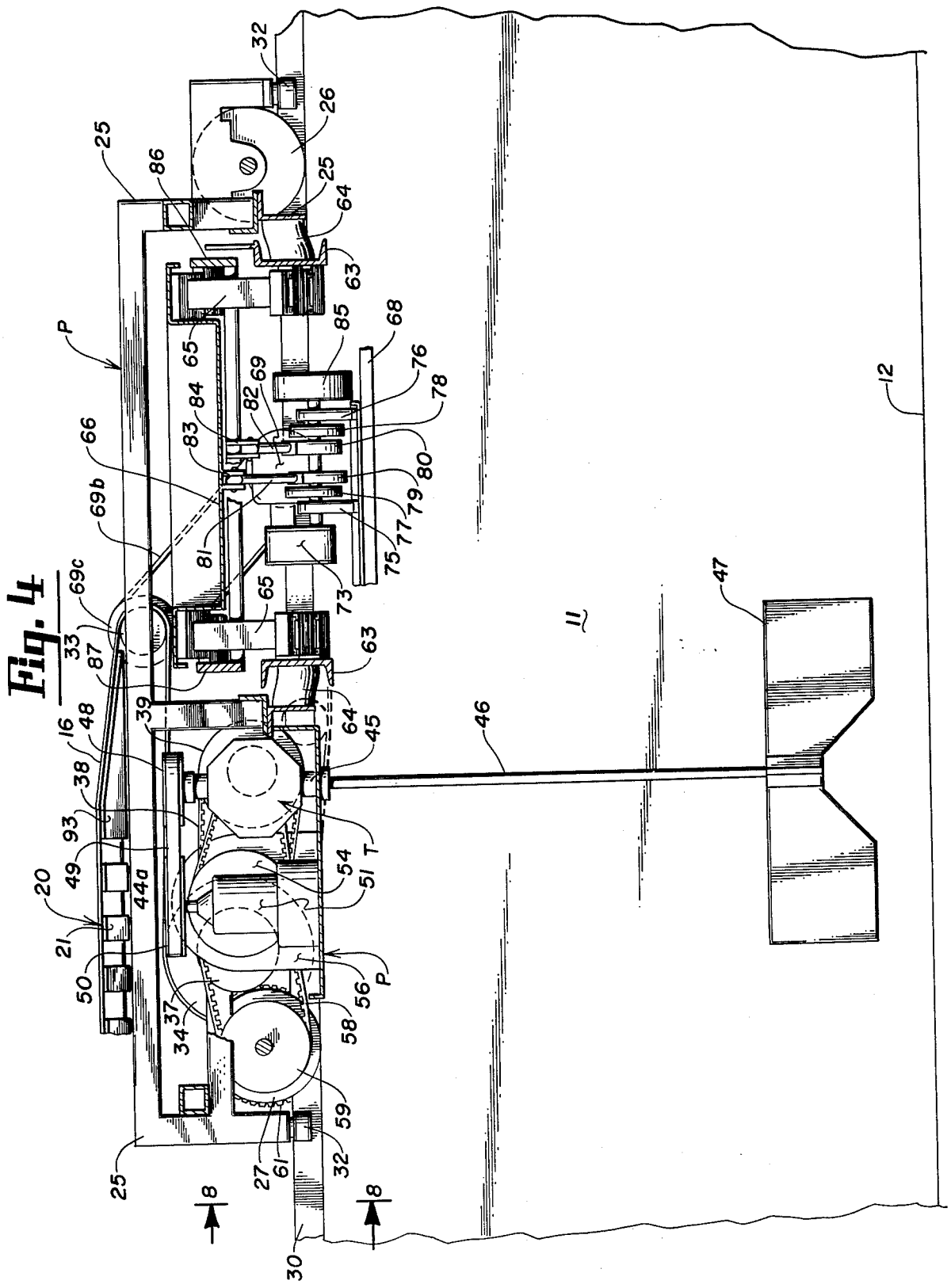

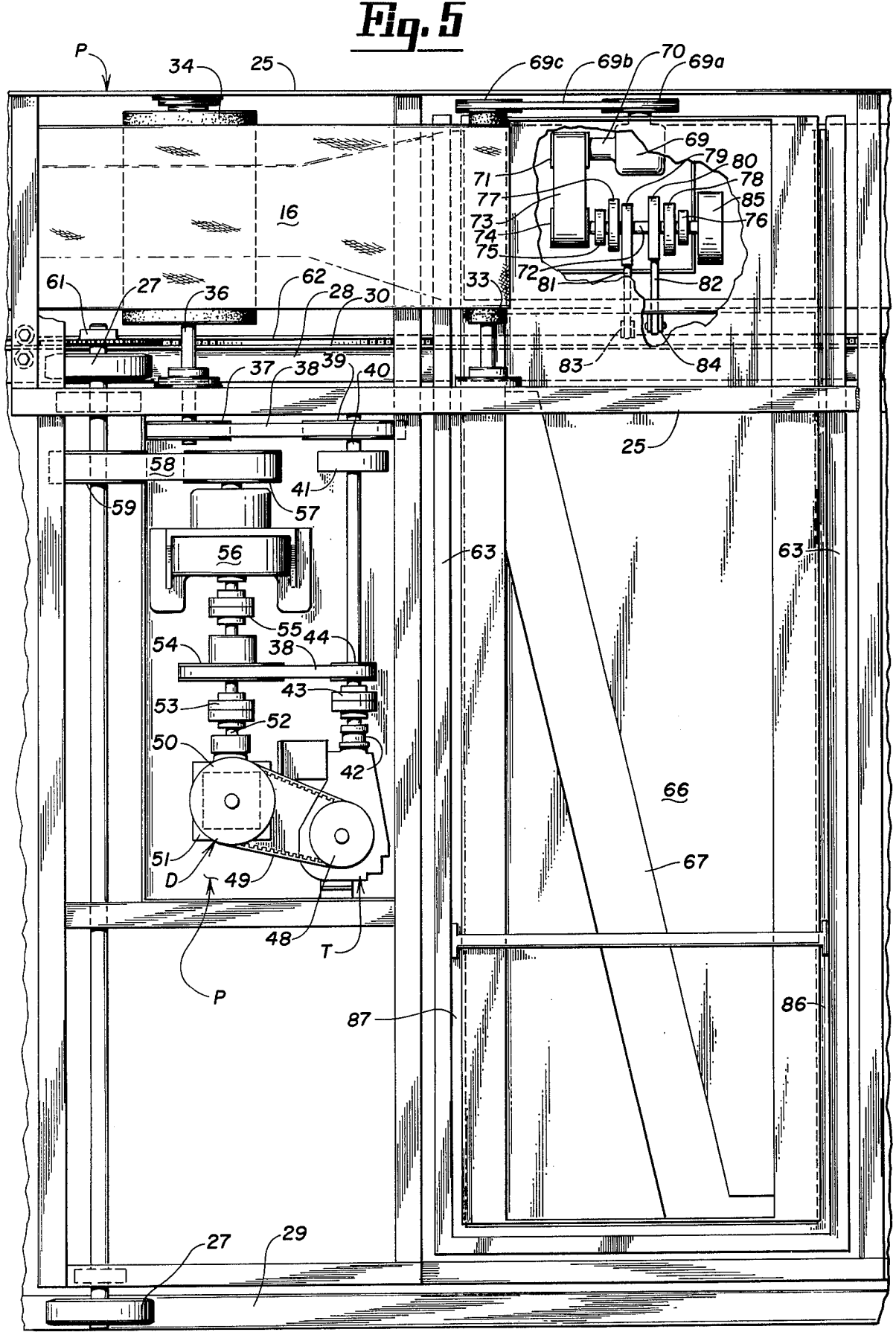

MATERIAL DISTRIBUTING SYSTEM FOR NONFREE-FLOWING PRODUCTS

This invention relates to a material distributing system. More particularly, it relates to a material distributing system designed to continuously replenish the supply of nonfree-flowing particulate material at the optimum location within a bin in order to permit the material to be added to and withdrawn from a bin at varying rates.

It is a general object of my invention to provide a novel and improved material distributing assembly of simple and relatively inexpensive construction and operation for maintaining a constant supply of material such as nonfree-flowing particulate products at the discharge end of a receptacle.

Another object is to provide a novel and improved material distributing assembly which is essentially entirely mechanical in construction and operation and is relatively reliable and maintenance free.

Another object is to provide a novel and improved material distributing assembly which is safer, more reliable, and less expensive to manufacture and operate than systems heretofore known and utilized in the field.

Another object is to provide a novel and improved material distributing assembly which will accept an efficiently distribute nonfree-flowing particulate products within a bin at varying rates.

Another object is to provide a novel and improved material distributing assembly which will accept and efficiently distribute free-flowing as well as nonfree-flowing particulate products within a bin at varying rates.

Another object is to provide a novel and improved material distributing assembly which will handle and distribute nonfree-flowing particulate products in a gentle and improved manner to attain minimum breakage and damage therefrom.

These and other objects and advantages of my invention will more fully appear from the following description, made in connection with the accompanying drawings, wherein like reference characters refer to the same or similar parts throughout the several views, and in which:

FIG. 1 is a side elevational view of a double bin construction material distributing system utilizing a pair of my material distributing assemblies;

FIG. 2 is a rear elevational view of the same;

FIG. 3 is a plan view of the same;

FIG. 4 is a vertical sectional view taken along line 4—4 of FIG. 2;

FIG. 5 is a plan view of my material distributing assembly;

Figure 6:
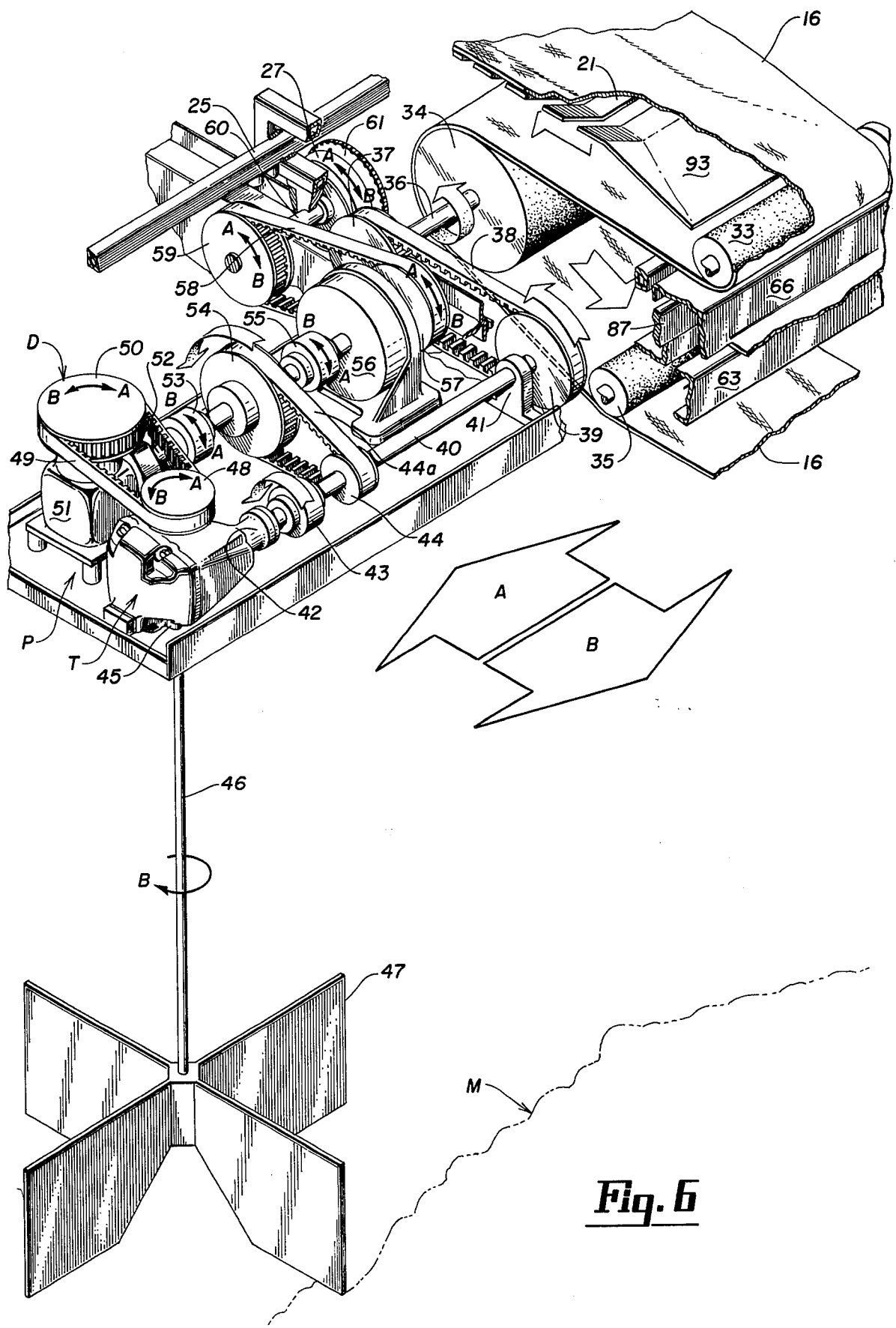
FIG. 6 is a pictorial view of the major portions of one of my material distributing assemblies illustrating the direction of rotation of the critical parts thereof, both when the assembly is advancing and when it is retreating.

The preferred embodiment of my invention is shown in FIGS. 1-8. These views show a material handling system which includes a general frame F which supports a lower bin 10 and an upper bin 11. Since the bins 10 and 11 and the material distributing assembly utilized in conjunction with each are essentially identical, only the construction of the upper bin 11 will be described herein. It will be noted that each of the bins is provided with a continuous segmented floor in the form of a continuous conveyor 12 which carries the material from the rear end portion 13 of the bin to the forward discharge end portion 14. The material to be received within the bins and to be discharged therefrom to other particulate product handling equipment (not shown) is deposited or provided for each bin at the rear end portion 13 thereof by any suitable means, such as a vertical bucket elevator (not shown) and gate means (not shown) for selectively delivering the material such as a nonfree-flowing particulate product. Among such products may be listed noodles, macaroni products, chips, pellets, cereals, etc. which must be handled carefully in order to avoid damage to the product. The means for delivering such a product to each of the bins is arranged relative to a continuous belt conveyor 15 so as to deposit the products thereon. Each bin is provided with such a belt conveyor 15 mounted at one side of the upper portion of a side wall of the bin and extending therealong throughout essentially its entire length. Each such belt conveyor 15 includes a continuous belt 16 which extends throughout the major portion of the length of the bin and is driven by drive roller 17 and its drive motor 18 located at the upper and forward end portion of the bin. The belt 16, as best shown in FIG. 1, passes around a plurality of tensioning rollers 19, and is supported during the portion of its travel through which it carries particulate material by an elongated segmented belt support 20. This belt support is comprised of a plurality of concavely-shaped or troughed segments 21, as best shown in FIG. 2 and FIG. 6. Each of the concave segments 21 is formed of Teflon impregnated oxidized aluminum and is hingedly connected to its adjacent segment at its opposite ends by roller chain links having Delrin rollers (not shown) which run within a pair of transversely spaced channel tracks as at 22 and 23. These tracks curve and reverse upon themselves, as best shown in FIG. 1, at the upper and rearward end portion of the bin. One end of the support 20 is free as at 24, and the other end thereof is secured to a mobile frame 25 of a material distributing mechanism, the structure of which is more clearly seen in FIGS. 4-8, inclusive.

The material distributing mechanism includes a platform member indicated generally by the letter P which extends transversely of the bin and well above the floor 12 thereof. The platform p is movably supported by a pair of front wheels, such as 26, and a pair of rear wheels 27. The front and rear wheels at the lefthand side of the platform P ride upon a track 28 which is formed from the upper edge portions of the side wall of the bin at the left side thereof and the front and rear wheels on the right side of the platform P ride upon a similar track 29, which is formed from the upper edge portion of the side wall at the right side of the bin. This can best be seen in FIG. 2.

Figure 8:
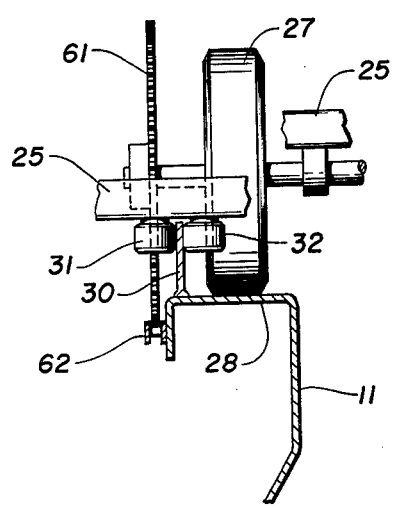
FIG. 8 is a fragmentary vertical sectional view taken along line 8—8 of FIG. 4.

Fastened to the upper surface of the outer edge portion of the track 28 and extending longitudinally thereof throughout its length is an upstanding guideblade, such as indicated by the numeral 30 in FIGS. 4 and 8. This guideblade 30 cooperates with two pair of guide rollers 31 and 32 shown in FIGS. 4 and 8 and carried by the frame 25 which supports the platform P. The blade member 30 and the guide rollers 31 and 32 cooperate to maintain the front and rear wheels 26 and 27 in proper alignment and traveling along the tracks 28 and 29, as desired.

Figure 7:
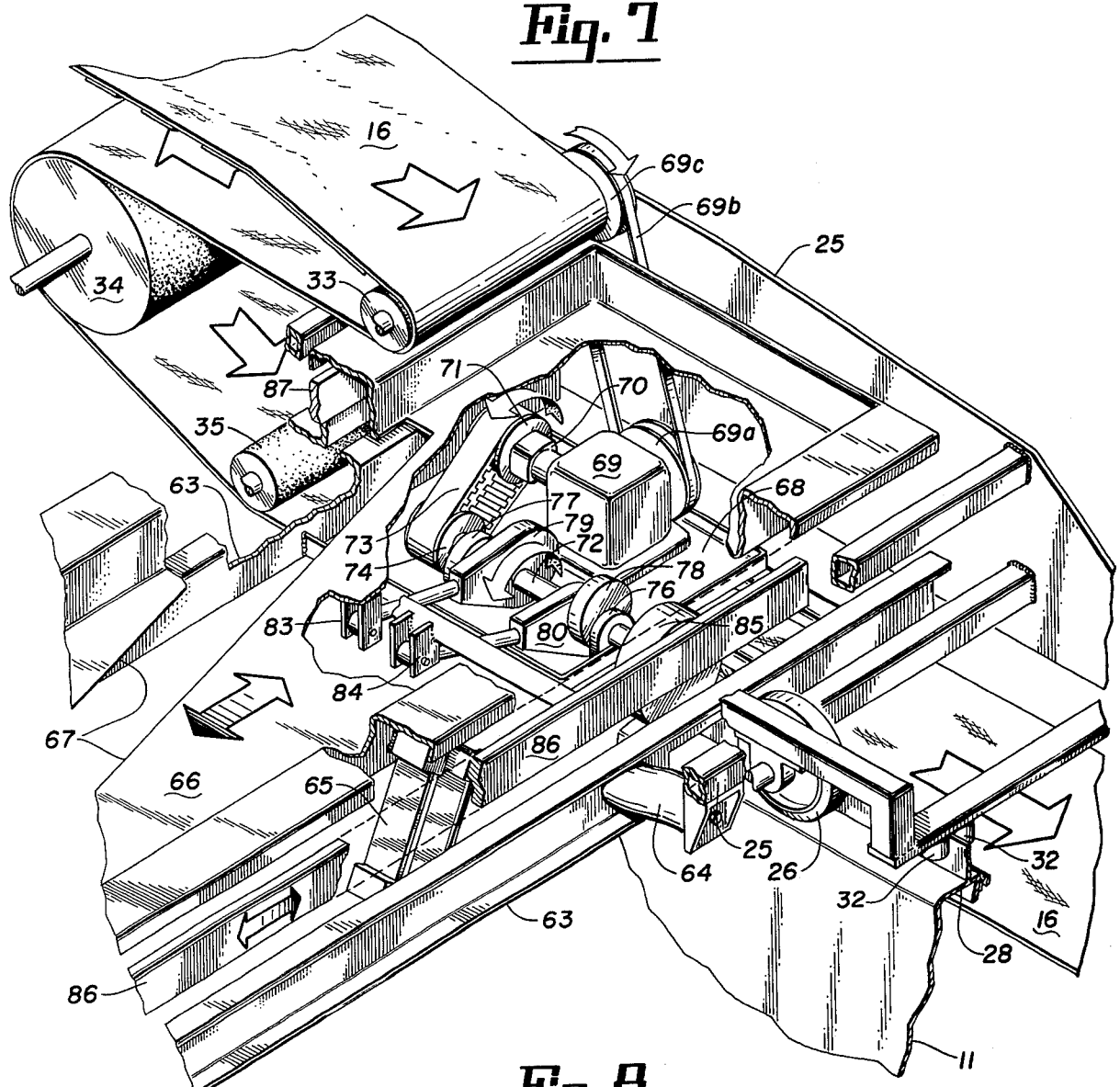
FIG. 7 is a pictorial view of the forwardmost portion of my material distributing assembly illustrating the drive mechanism by means of which the transverse vibrating pan is supported and driven.

As best shown in FIGS. 6 and 7, there is a delivery and power take-off roller 33 rotatably mounted upon the upper portions of the frame 25 and about which the belt 16 is entrained. Also rotatably mounted upon the frame 25 and rearwardly disposed and below the delivery roller 33 is a power take-off and belt reversing roller 34. As shown in FIGS. 6 and 7, the belt 16 then extends forwardly beneath a guide roller 35 which also is rotatably mounted on the frame 25. By reference to FIG. 1, it can be seen that the upper rung of the belt conveyor 16 passes around the rollers 33–35, inclusive, and then extends forwardly around the drive roller 17. The lower rung of the belt extends rearwardly from the drive roller 17 to the tensioning rollers 19.

It will be readily seen that from this construction, the drive roller 17 constantly draws the platform 25 and the distributing mechanism carried thereby (as hereinafter described) forwardly since the upper rung will be constantly pulling forwardly against the power take-off and belt reversing rollers 33 and 34. Thus, the entire mechanism is constantly urged forwardly by the drive motor 18 and belt 16 and, as will be seen, constitutes the source of power for the entire material distributing mechanism to be hereinafter described.

The power take-off roller 34, as best shown in FIG. 6, provides the power for a differential power transmission indicated generally by the letter T, and a reverse drive mechanism indicated generally by the letter D, the latter of which is utilized to drive the frame 25 and platform P rearwardly when such movement is appropriate as indicated by a sensor.

As best shown in FIG. 6, the power take-off and belt reversing roller 34 is mounted upon a shaft 36 which carries a timing belt drive sprocket 37 which in turn is connected by a timing belt 38 to another sprocket 39. This sprocket 39 is mounted upon a countershaft 40 which is supported upon the platform P in frame 25 by a bearing such as indicated by the numeral 41.

The countershaft 40 extends laterally of the belt conveyor 16 and is connected to the input 42 of the differential transmission T as clearly shown in FIG. 6. It is coupled to the input 42 by a coupling 43 and carries a clutch drive sprocket 44.

The lower output 45 of the differential transmission T carries a depending shaft 46 which in turn has a four-bladed rotary sensor 47 at its lower end and supprots the same approximately 1 to 2 or more feet above the conveyor floor 12 of the bin. This can be seen in FIG. 4 as well as in FIG. 6.

The other output of the differential transmission T is connected to a sprocket 48. This sprocket 48 is connected by a timing belt 49 to a sprocket 50, which in turn is connected in driving relation to a 90° angle gear box 51.

Extending laterally from the gear box 51 is a shaft 52 coupled by a coupling 53 to an overrunning clutch 54, which in turn is coupled by coupling 55 and appropriate shaft to reversing gear reducer 56. A gear reducer output sprocket 57 is carried by the gear reducer 56 and is connected by a timing belt 58 to a wheel drive sprocket 59. The wheel drive sprocket 59 is mounted upon a shaft 60 which in turn is mounted upon the frame 25 and carries one of the rear wheels 27 thereof, as well as a roller chain sprocket 61. This roller chain sprocket 61 and rear wheel 27 are fixed relative to each other and control the movement of the frame 25 and platform P and the material distributing mechanism carried thereby. Roller chain sprocket 61 extends downwardly past the track upon which the wheel 27 rides and engages a roller chain track 62, which is carried by the outer lip of the side wall of the bin and extends therealong as is best shown in FIG. 8.

Mounted upon the frame 25 and depending therefrom somewhat is a subframe 63 which also extends transversely above the bottom of the bin as best shown in FIG. 7. This subframe 63 is supported from the frame 25 by plurality of rubber vibration isolators 64, which can be purchased from Lord Kinematics, 2730 West 12th Street, Erie, Penna. and can be identified as Part No. J-5425-30B. This subframe supports a plurality of fiber glass leaf springs 65 which, as shown in FIG. 7, are arranged in pairs and constitute six in number at each side. These leaf springs are connected at their upper ends to a material distributing structure in the form of a vibrating pan or chute 66 and to a pair of balancing counterweights 86 and 87. The vibrating pan 66 has a diagonally extending slot 67 formed therein, and is disposed in receiving relation ahead of and below the delivery roller 33 so as to receive the particulate material or product as it is projected forwardly by the belt conveyor 16 into the pan. It will be noted that the slot 67 extends diagonally from the side of the pan nearest the delivery roller 33 and extends to the opposite side of the pan to a point adjacent the opposite end thereof and terminates in an open portion or slot which extends longitudinally of the bin. The slot 67, it will be noted, originates slightly laterally of the point at which the material is deposited into the pan 66 by the delivery roller 33 and belt 16.

Mounted upon a support pan 68, which is carried by the subframe 63, is a bevel-gear box 69, the gears of which are driven by a sheave 69a and a belt 69b which extends around a sheave 69c carried in driven relation by the power take-off and delivery roller 33. Extending laterally from the gear box 69 is a shaft 70 which rotatably mounts a gear box output timing belt sprocket 71 and drives a countershaft 72 by means of a timing belt 73 and a sprocket 74 which is carried by the outer end of the countershaft. The countershaft 72 is rotatably mounted on the pan 68 by a pair of bearings 75 and 76. Also mounted upon the shaft 72 just inwardly of the two bearings 75, 76 is a pair of counterbalances 77, 78 which provide counterbalance for a pair of eccentrics 79, 80. These eccentrics 79, 80 are each connected in driving relation to the underside of the pan 66. This connection is accomplished by a pair of eccentric connecting rods 81, 82 which are pivotally connected to a pair of clevis members 83, 84. This construction can best be seen in FIGS. 4, 5 and 7.

As will be readily seen from FIG. 7 and from the above, the power take-off roller 33 and sheave 69c drive the eccentrics 79 and 80 to vibrate the pan 66 and cause the particulate product to gradually shift transversely of the bin until it reaches the diagonal slot 67 at which point it is permitted to drop into the bin. The fiber glass leaf springs 65 flexibly support the pan 66 to permit the vibration of the pan to be effective and non-damaging to the construction of the mechanism. The counterbalances aid in this function, as does the fly wheel 85, which is carried by the shaft 72, and the vibrating counterweights 86 and 87 which are carried at opposite sides of the mountings which secure the leaf springs 65 to the pan 66. These can best be seen by reference to FIG. 4.

Mounted upon the discharge end portin of each of the bins on an incline, is a rotary mechanism designed to discharge the particulate material, indicated generally by the letter M, in FIG. 1, in a uniform manner to whatever machinery is positioned to receive this material from the bin. Uniformly of discharge is imperative with respect to food packaging machinery, particularly in connection with the packaging of cereals, etc. Since the material may be nonfree-flowing, it is imperative that some provision be made for causing the materials to be discharged uniformly for otherwise it tends to build up adjacent the end portion of the conveyor 12 and then avalanche upon the receiving mechanism in very nonuniform quantities. To ensure such uniform discharge, I have provided a power driven conveyor indicated generally by the numeral 88 which is comprised essentially of a plurality of transverse mounting bars 89 which are spaced longitudinally of a pair of drive chains 90, one of each of which supports the opposite ends of the transverse bars. The latter bars are spaced along the links of the chain 90, as shown in FIG. 1, and each supports a plurality of uniquely designed lifting teeth 91 formed of Teflon impregnated oxidized aluminum, which are shaped as shown and function effectively to engage the material M gently, and gradually lift it as it moves the material to discharging positon. In order to ensure against such teeth engaging excessive quantities or causing cavities in the mass of particulate material engaged thereby, I have mounted eccentric bearings and connecting links to each of the lower pair of sprockets 92, which drive the chains 90 eccentrically so that as the conveyor 88 rotates, the lower rung thereof rises and falls harmonically but retardedly out-of-phase and, during the rising action tends to redistribute an excessive amount of engaged material, and during the falling action tends to engage a further amount of material effectively. As a consequence, the particulate material is presented in an unusually uniform flow to the discharge end of the conveyor 12 and damage to the particulate material is maintained at a minimum level.

In operation, the particulate material, or product, is deposited upon the belt 16 which is supported by the concave segments 21. Since these segments are formed of Teflon impregnated oxidized aluminum, there is an absolute minimum of friction therebetween and the belt 16 moves very easily relative thereto despite the weight of the particulate material upon the belt 16. As the material approaches the delivery roller 33, it is permitted to spread somewhat since the final segment 93 is transitioned to a somewhat flattened position, as best shown in FIG. 6. As the material is deposited by the belt 20 into the pan 66, the vibrations of the pan cause it to shift transversely and to be distributed uniformly across the width of the bin at whatever location and distributing assembly is positioned. It will be noted that the delivery roller 33 drives the vibrating mechanism provided for the pan 66, and the delivery roller 33 is, in turn, driven by the belt 16 and the motor 18 which is a source of power for the entire material distributing mechanism.

As indicated hereinbefore, the drive motor 18 and belt 16 constantly urge the entire material distributing mechanism forwardly toward the end of the bin. As the mechanism moves forwardly, the sensor paddles 47 eventually engage the material M and are stopped from rotation thereby. When this takes place, the other output of the differential transmission T is driven in an opposite direction indicated by the arrow adjacent the letter A, as shown in FIG. 6. This in turn causes the timing belt sprocket 50 to be driven in the same direction as indicated by the arrow and letter A thereon, and in turn, the coupling 53 is rotated as indicated by the arrow and letter A thereon. Similarly, the coupling 55 is rotated in the direction of the arrow adjacent the letter A and the gear reducing output sprocket is driven in the opposite direction as indicated by the arrow adjacent the letter A thereon. As a consequence, the sprocket 50 is driven in the direction indicated by the arrow adjacent the letter A as is the wheel 27. Thus, the entire mechanism is driven rearwardly until such time as the paddles 47 no longer engage the material M and are again free to rotate. At that point, the pull of the belt 16 again causes the entire mechanism to be moved forwardly, the roller chain sprocket 61 and wheel 27, causing the gear train to reverse in the opposite direction as indicated by the arrows adjacent the letter B throughout. Thus, there is a constant function of the mechanism seeking the forwardmost point at which the material should be deposited. Therefore, irrespective of the rate at which the material is discharged by the movable bottom 12 of the bin, the material which is presented to the conveyor 16 will always be deposited in a uniform manner across the width of the bin at the rear of the supply of material within the bin, but always at the most desirable forwardmost point.

The function of the overrunning clutch 54 which constantly rotates in the direction of the arrow shown is to preclude unduly rapid movement forwardly by the entire mechanism. Thus, when the mechanism is being drawn forwardly by the conveyor belt 16, the overrunning clutch 54 prevents the mechanism from moving more rapidly than the uniform speed provided by the belt 16 as it drives the shaft 40, sprocket 44 and belt 44a.

It should be noted that all of the power for the differential transmission is provided by the rotary source of power 18 and belt 16 through the power take-off and belt reversing roller 34. Likewise, the power which is supplied to drive the drive mechanism and the platform P in the opposite direction is supplied through the belt 16, roller chain track 62 and roller chain sprocket 61. Likewise, all of the power for driving the sensor mechanism 47 is supplied through the belt 16 and power take-off roller 34. Thus, all of the power for movement either forward or backward of the material distributing mechanism is provided by the motor 18, as well as the power for the sensor mechanism 47, and the power for the material vibratory conveying structure consisting of the pan 66 and associated drive, including power take-off roller 33.

It will be noted that the belt conveyor support 20 rides freely within the tracks 22 and 23 which reverse upon themselves so that the free end 24 will move toward the rear end of the bin as the material distributing mechanism moves forwardly and will move in the opposite direction toward the forward portion of the bin as the material distributing mechanism is driven rearwardly by the drive mechanism D. The lack of friction between the concave segments 21 and the belt 16, as well as the lack of friction between the Delrin rollers supporting such segments and the tracks 22 and 23 permit the conveyor support to move forwardly and rearwardly within the tracks much as a flexible supporting apron.

From the above, it can be seen that I have provided a novel and improved material distributing mechanism which is essentially completely mechanical in structure in operation and which is highly sensitive to the presence, or lack of presence, of the particulate material. As a consequence, a more efficient job is effected of maintaining the particulate material at the desired level and location within the bin irrespective of varying rates at which the material M may be discharged from the bin by the moving floor 12. Moreover, the means by which the nonfreeflowing or free-flowing particulate material is carried to the material distributing mechanism provides all of the power for operating that mechanism both with respect to the vibratory conveying and distribution of the material evenly across the width of the bin and with respect to the constant seeking of the forwardmost point at which the material should be deposited.

It will, of course, be understood that various changes may be made in the form, details, arrangement and proportions of the parts without departing from the scope of my invention which consists of the matter shown and described herein and set forth in the appended claims.

What I claim is:

1. In a material conveying assembly,
 a. a receptacle having a bottom,
 b. a material-distributing mechanism movably mounted above the bottom of said receptacle for movement back and forth along one of the dimensions of said receptacle,
 c. means for providing material to said distributing mechanism for distribution thereby,
 d. means connected to said mechanism for urging the same to move in a predetermined direction,
 e. a differential power transmission mechanism connected to said distributing mechanism and having a power input and a pair of power outputs,
 f. a source of rotary power connected to said power input of said differential power transmission mechanism,
 g. a rotary sensor connected to one of the power outputs of said differential power transmission mechanism and positioned relative to said distributing mechanism to sense the position of the latter relative to other objects, and,
 h. drive mechanism connected in driven relation to the other of said power outputs of said differential power transmission mechanism and in driving relation to said material distributing mechanism to move the latter in the opposite direction when said rotary sensor engages another object and is prevented from rotating thereby.

2. The structure defined in claim 1 wherein said means for providing material to said distributing mechanism is comprised of a continuous belt conveyor and constitutes said source of rotary power.

3. The structure defined in claim 1 wherein said means for providing material to said distributing mechanism also constitutes said means for urging said distributing mechanism to move in a predetermined direction.

4. The structure defined in claim 1 wherein said means for providing material to said distributing mechanism is comprised of a continuous belt conveyor and constitutes said source of rotary power and said means for urging said distributing mechanism to move in a predetermined direction.

5. The structure defined in claim 1 wherein said receptacle has a discharge end portion and said means for providing material to said distributing mechanism is comprised of a continuous belt conveyor which constitutes means constantly urging said distributing mechanism to move forwardly toward the discharge end portion of said receptacle, and wherein said drive mechanism drives said distributing mechanism toward the opposite end of said receptacle when said rotary sensor is prevented from rotating.

6. The structure defined in claim 1 wherein said means for urging said distributing mechanism to move in a predetermined direction is a continuous belt conveyor.

7. The structure defined in claim 1 wherein said means for providing material to said distributing mechanism is comprised of a continuous belt conveyor and constitutes said means for urging said distributing mechanism to move in a predetermined direction.

8. The structure defined in claim 1 wherein said material distributing mechanism includes power driven material-agitating structure, and said means for providing material to said distributing mechanism also is connected in driving relation to said material-agitating structure.

9. The structure defined in claim 1 wherein said means for providing material to said material distributing mechanism is comprised of a continuous belt conveyor, and said material distributing mechanism includes power driven material-agitating structure, and said belt conveyor is connected in driving relation to said material-agitating structure.

10. The structure defined in claim 1 wherein said means for providing material to said material-distributing mechanism is comprised of a continuous belt conveyor and said material distributing mechanism includes material-agitating structure, said belt conveyor constituting said source of rotary power and said means for urging said distributing mechanism to move in a predetermined direction and being connected in driving relation to said material-agitating structure.

11. The structure defined in claim 1 wherein said means for providing material to said material-distributing mechanism is comprised of a continuous belt conveyor and constitutes said source of rotary power and is connected in driving relation with said rotary sensor and said drive mechanism.

12. In a material distributing assembly,
 a. a movable material distributing mechanism,
 b. means for urging said mechanism in a predetermined direction,
 c. a differential power transmission mechanism connected to said distributing mechanism and having a power input and a pair of power outputs.
 d. a source of rotary power connected to said power input of said differential power transmission mechanism,
 e. a rotary sensor connected to one of the power outputs of said differential power transmission mechanism and positioned relative to said distributing mechanism to sense its position relative to other objects, and f. drive mechanism connected in drive relation to the other of said power outputs of said differential power transmission mechanism and in driving relation to said material distributing mechanism for driving the latter in the opposite direction when said rotary sensor is prevented from rotating.

13. The structure defined in claim 12 wherein said source of rotary power constitutes said means for urging said mechanism in a predetermined direction.

14. The structure defined in claim 12 and conveyor means for bringing material to said material distributing mechanism, said conveyor means also constituting said source of rotary power.

15. The structure defined in claim 12 and conveyor means for bringing material to said material distributing mechanism, said conveyor means also constituting said means for urging said material distribution mechanism in a predetermined direction.

16. In a positioning device,
    a. a movable platform,
    b. means for urging said platform in a predetermined direction,
    c. a source of rotary power,
    d. a differential mechanism having a power input and a pair of power outputs,
    e. said differential mechanism being connected to said platform and having its power input connected to said source of rotary power in driven relation,
    f. a rotary sensor connected in driven relation to one of the power outputs of said differential mechanism and,
    g. platform moving mechanism connected to said platform and connected in driven relation to the other power output of said differential mechanism for driving said platform in the opposite direction when said rotary sensor is prevented from rotating.

17. The structure defined in claim 16 wherein said source of rotary power constitutes said means for urging said platform in said predetermined direction.

18. In a material conveying assembly,
    a. a receptacle having a bottom,
    b. a material distributing mechanism movably mounted above the bottom of said receptacle for movement back and forth along one of the dimensions of said receptacle,
    c. means for providing material to said material distributing mechanism for distribution thereby, d
    d. means connected to said mechanism for urging the same to move in a predetermined direction,
    e. sensor controlled power-driven drive mecahnism connected in driving relation to said material distributing mechanism for moving the same in an opposite direction when activated, and
    f. sensor mechanism connected to said drive mechanism in controlling relation to cause the same to so move said material distributing mechanism when said sensor mechanism is activated,
    g. said means for providing material to said distributing mechanism being connected in driving relation to at least one of said drive mechanism and said material distributing mechanism and said sensor mechanism.

19. The structure defined in claim 18 wherein said means for providing material to said material distributing mechanism constitutes an endless belt conveyor.

20. The structure defined in claim 18 wherein said means for providing material to said material distributing mechanism also is connected in driving relation to said drive mechanism.

21. The structure defined in claim 18 wherein said sensor mechanism is power driven and said means for providing material to said material distributing mechanism is connected to said sensor mechanism in driving relation.

22. The structure defined in claim 18 wherein said material-distributing mechanism includes transversely extending material agitating mechanism for spreading the material across said receptacle, and wherein said means for providing material to said material-distributing mechanism is connected to said transverse material-agitating mechanism in driving relation to facilitate the spreading of such material thereby.

23. In a material conveying assembly,
    a. a receptacle having a bottom,
    b. a material distributing mechanism movably mounted above the bottom of said receptacle for movement back and forth along one of the dimensions of said receptacle,
    c. means connected to said mechanism for urging the same to move in a predetermined direction,
    d. means for providing material to said material distributing mechanism for distribution thereby,
    e. sensor-controlled power-driven drive mechanism connected in driving relation to said material distributing mechanism for moving the same in an opposite direction when activated and,
    f. sensor mechanism connected to said drive mechanism in controlling relation to cause the same to so move said material distributing mechanism in accordance with the location of material within said receptacle as sensed by said sensor mechanism.
    g. said means for providing material to said distributing mechanism being also connected to said drive mechanism and constituting a source of power for driving the same.

* * * * *